(12) United States Patent
Lawson et al.

(10) Patent No.: US 8,570,008 B2
(45) Date of Patent: Oct. 29, 2013

(54) ENERGY PREDICTIVE BUCK CONVERTER

(75) Inventors: Thomas E. Lawson, Malvern, PA (US);
William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 399 days.

(21) Appl. No.: 12/949,345

(22) Filed: Nov. 18, 2010

(65) Prior Publication Data

US 2011/0115455 A1 May 19, 2011

Related U.S. Application Data

(60) Provisional application No. 61/262,198, filed on Nov. 18, 2009.

(51) Int. Cl.
*G05F 1/40* (2006.01)
*G05F 1/613* (2006.01)

(52) U.S. Cl.
USPC .......................................... 323/271; 323/225

(58) Field of Classification Search
USPC ......... 323/222, 225, 268, 271, 282, 283, 285, 323/288
See application file for complete search history.

(56) References Cited

U.S. PATENT DOCUMENTS

| | | | |
|---|---|---|---|
| 5,481,178 A | | 1/1996 | Wilcox et al. |
| 5,808,455 A | * | 9/1998 | Schwartz et al. ............. 323/271 |
| 6,304,066 B1 | | 10/2001 | Wilcox et al. |
| 6,580,258 B2 | | 6/2003 | Wilcox et al. |
| 7,342,391 B2 | * | 3/2008 | Tateno et al. ................. 323/316 |
| 8,274,267 B2 | * | 9/2012 | Grimm ......................... 323/274 |
| 2008/0174286 A1 | * | 7/2008 | Chu et al. ...................... 323/271 |

* cited by examiner

*Primary Examiner* — Matthew Nguyen
(74) *Attorney, Agent, or Firm* — Mendelsohn, Drucker & Dunleavy, P.C.; Steve Mendelsohn

(57) ABSTRACT

A switched-mode buck power converter includes a power source, a first switch, an inductor for storing energy, a diode or second switch, and control circuitry. The inductor has a first end connected to an output node of the power converter, wherein the first switch is connected between the power source and a second end of the inductor. The diode or second switch is connected, at the second end of the inductor, between the first switch and a common node of the power converter. The control circuitry is configured to (i) characterize per cycle energy demand of the power converter, (ii) characterize per cycle inductive energy of the power converter, and (iii) compare the characterized energy demand to the characterized inductive energy to control the first switch.

20 Claims, 6 Drawing Sheets

ENERGY PREDICTIVE BUCK CONVERTER

CROSS-REFERENCE TO RELATED APPLICATIONS

The present application claims the benefit of U.S. Provisional Application No. 61/262,198 filed on Nov. 18, 2009, which is incorporated herein by reference.

STATEMENT REGARDING FEDERALLY SPONSORED RESEARCH OR DEVELOPMENT

The present invention was not developed with the use of any Federal Funds, but was developed independently by the inventors.

BACKGROUND OF THE INVENTION

Conventional buck converters are often controlled by comparison of inductive energize time with a voltage error term. Inductive energize time is often represented by a ramp signal. An auxiliary feedback loop based on current mode control is sometimes used in conjunction with voltage control to improve performance during continuous conduction mode (CCM). There are many prior art "slope compensation" techniques that modify the slope of the ramp signal to improve the stability of the converter control loop and/or to improve its dynamic response. Such techniques are effective to the extent that they approximate the underlying equations relating energy to voltage and current, which formulas for energy transfer relate to the squares of the voltages and currents involved. To the extent that prior art techniques fail to conform to the underlying energy equations, they fail to optimize regulation dynamics and flexibility.

When the voltage error term in a conventional power converter is too small, or too delayed, to provide adequate and timely feedback, its control loop is effectively opened and instability results. Conventional converters are often only stable over a restricted range of duty cycles. Once the feedback loop is opened, or an element of positive feedback is introduced, poor transient response, oscillation or even a destructive runaway condition may result.

Additionally, even with per-cycle energy balancing, recovery from severe transients may suffer if energy balance information is destroyed at the beginning of each chopping cycle.

BRIEF DESCRIPTION OF THE INVENTION

Since energy demand is responsive to output error, which error remains uncorrected without energy balance, an energy demand signal tends to be self-preserving from cycle to cycle, even if partial error correction has occurred. In most converters, some sort of ramp more or less accurately represents energy supply. If this ramp be reset for each chopping cycle, whilst an inductor continues to charge from a given cycle to a later cycle, this ramp will grossly misrepresent energy supply. If, however, inductive current, or a volt-time representation thereof, is incorporated into the energy supply term, energy supply information survives from cycle to cycle allowing inductive energy supply to be controlled to match energy demand over multiple cycles. By thusly controlling a switched-mode buck power converter with energy balancing, its main feedback loop may be kept closed even when balance of energy demand and energy supply is not attained within a single chopping cycle. Such multi-cycle balance control optimizes transient response and stability. It should be noted that a substantially accurate estimate of inductor pedestal, or valley, current is needed to maintain energy balance in a converter operating in the CCM. Linear and squared control terms are piecewise-proportional when those terms remain close to unity. Accordingly, the advantages of energy balancing in a buck converter are limited until the converter becomes significantly out of energy balance. For that reason, this invention also teaches multi-cycle energy balancing buck converter control based on voltage and time, as a volt time product can approximate energy.

Partial implementations of this invention, squaring neither demand nor supply terms, or squaring but one of the two, are possible. Note that most partial implementation would only make sense in a parts-constrained analog environment. With a digital controller, there would be little reason to forgo the improvement provided by squared terms. As more energy terms are represented by squares, (combined with appropriate gain corrections) dynamic performance improves. Because inductive current varies over the widest range, it is the most important term to square, be it a time term, a volt-time product, or a measured current. Note that an AC coupled inductive current term can be sufficient, since time alone is adequate for determining the supply term under static conditions. The inductive current signal is only needed to correct for energy stored in the inductor during rapidly changing conditions, or across multiple cycles. Another utile partial implementation would practice conventional control for steady-state operation, but switch to energy balancing control if regulation was lost.

Control loops according to this invention not only work over a range of duty cycles from under 1% to over 80%, but can also remain stable over multiple control cycles. Predictive energy balancing control can also lower component stresses to improve reliability by minimizing unnecessary swings in inductor current and undesired swings in output voltage.

Under any one set of operating conditions, converters practicing prior-art control can be made stable through compensation techniques and appropriate gain settings. The circuits and methods taught here allow stable operation over a wider range of conditions. Component's resistance, capacitance and inductance change with time and temperature, and load capacitance and current can change unpredictably, so flexibility brings benefits even under constrained conditions. Also, more responsive control allows more aggressive digital power management strategies. The ability to maintain stable operation over a wider range of conditions improves utility and reliability.

In a switched-mode buck power converter, a switch of conventional character is alternately used to charge and discharge an inductive reactor to cause a DC input voltage to be regulated to a lower DC output voltage. To regulate such a converter according to this invention, a quantity representing the square of an output voltage, appropriately scaled, is subtracted from a quantity representing the square of a desired output voltage to generate a difference representing per-cycle energy demand. Another quantity representing the square of the time having elapsed since the commencement of inductive energy charging is compared with the per-cycle energy demand. When the time-squared quantity exceeds the energy demand quantity, the switch is operated to cease inductive reactor charging and commence inductive discharge.

In practice, both the actual instantaneous output voltage of the converter and a reference voltage representing the desired output voltage may be squared by well-known multipliers. A well-known subtractor (difference amplifier) may subtract the output of the output voltage multiplier from that of the reference voltage multiplier to produce a difference output.

A well-known ramp generator, representing time, may be fed to yet another multiplier to produce a signal representing the square of elapsed inductive charging time. A well-known comparator may be used operate the switch to terminate inductive charging when the time-squared output exceeds the aforementioned difference output.

When this converter is operated in the continuous current mode (CCM), stability and transient response may be improved by adding inductive current pedestal control according to this invention. It is well-known that the duty-cycle of a lossless buck converter is equal to output voltage divided by input voltage. Thus, the time of inductive charging equals the product of cycle period and desired voltage divided by input voltage. For a loss-less converter, such time control alone of a switch controlling an inductor might provide correct average output voltage, albeit with perhaps unacceptable transient behavior. Real converters, however, require closed feedback loops to improve transient behavior and to accommodate losses. The portion of the invention described above provides regulation and superior transient response in the discontinuous current mode (DCM), but may be improved according to this invention, as shown below, when the converter is operated in the CCM.

To practice pedestal control according to this invention, first the time of the ideal duty cycle is determined as described above, and a quantity representing this ideal inductive charging time is generated. This steady-state time quantity is subtracted from the actual elapsed inductive charging time to provide a change-of-pedestal quantity, which is squared and appropriately scaled. Since squaring removes the sign of the change-of-pedestal quantity, its sign is detected, and applied to the squared output to generate a correction quantity. The correction quantity is subtracted from the aforementioned time-squared quantity to provide a corrected inductive energy quantity for energy balancing. If the energize period is ended before the steady state time, the pedestal will drop. If terminated after, the pedestal will rise. Because stable operation requires a stable pedestal under steady conditions, pedestal prediction serves to reduce the tendency to terminate the energize period early, which then causes the pedestal to droop, which then requires a longer energize period in the subsequent cycle, thereby inducing sub-harmonic oscillation. The pedestal energy prediction also acts to reduce the tendency toward oscillation by increasingly favoring termination of the energize period late in the chopping cycle. Note that the stability thereby obtained is due to matching the shape of the pedestal feedback to the underlying energy transfer, as distinct from prior-art slope compensation based on voltage and/or current, but not on energy.

In practice, the reference voltage and a voltage representing cycle period may be applied to the multiply inputs of a well-known multiplier-divider, and input voltage be applied to the divide input thereof. The resulting signal represents ideal inductive charging time. A well-known subtractor circuit may subtract this time signal from the aforementioned ramp signal representing elapsed inductive charging time. The resulting difference signal may be fed to two inputs of a well-known multiplier and to a well-known comparator circuit. To a third multiplier input a scaling input may be connected. To the output of the multiplier may be connected one pole of an SPDT switch and a well-known inverter. To the output of the inverter the other pole of the switch may be connected. The comparator may be used to operate the switch to apply the sign of the difference signal to the multiplier output. The resulting pedestal energy correction signal may be applied to another subtractor to be subtracted from the time-squared signal. The resulting corrected inductive energy signal may then be used to determine energy balance to control inductive charging.

It should be understood that, at a point in time during any given cycle, the inductive current pedestal for that cycle cannot be explicitly measured until the cycle has ended. At cycle's end, the output voltage ripple has already descended. Therefore if the pedestal of that cycle has been too low or too high, it is too late to add or refrain from adding inductive energy during that cycle. Correction must then be made, in accordance with the prior art, in subsequent cycles, which invites sub-harmonic ripple generation and inferior transient response. Correction according to this invention predicts whether the inchoate inductive current pedestal will match energy demand. If either under-supply or over-supply is predicted, this pedestal control adjusts inductive reactor charging time immediately to control inductive energy, without waiting for output voltage to drop or rise. Thus transient load regulation is improved and sub-harmonic ripple generation is reduced.

DETAILED DESCRIPTION OF THE INVENTION

Figure 1:
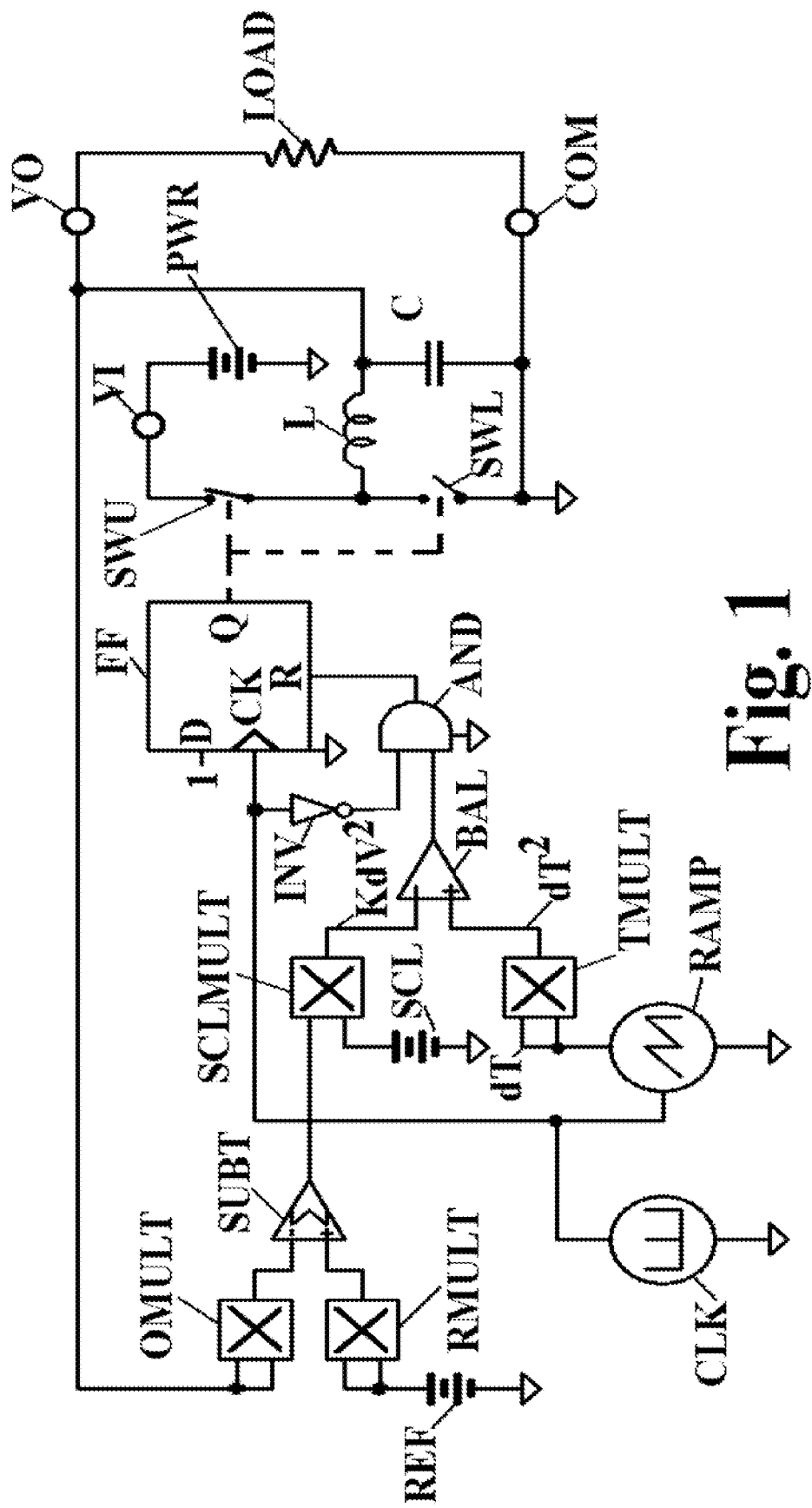
FIG. 1 shows a switched-mode buck power converter embodying energy-balancing regulation according to this invention.

Referring first to FIG. 1, a conventional totem-pole switch comprises SWU and SWL, upper and lower switches respectively. Driven by D flip-flop FF, at some duty cycle between the voltage from power source PWR on terminal VI and the voltage on terminal COM, the totem pole switch presents some average voltage to inductive reactor L. Reactor L and filter capacitor C form an output filter to smooth the output voltage presented to load LOAD through terminal VO. Inverter INV and AND-gate AND prevent FF from being reset during the clock pulse from clock generator CLK. These circuit functions are well known in the prior art.

According to this invention, the voltage at VO is also applied to both inputs of multiplier OMULT, the output of which, representing the square of actual output voltage at VO, is applied to the negative input of SUBT. A voltage from source REF, proportional to desired output voltage, is applied to both inputs of multiplier RMULT, the output of which, representing the square of desired output voltage, is applied to the positive input of SUBT. The output of SUBT represents the amount by which the square of actual output voltage is less than the square of desired output voltage. This difference signal is applied to one input of multiplier SCLMULT, which scales its output, KdV2 proportional to the voltage from scaling source SCL. KdV2, representing energy demand, is applied to the negative input of comparator BAL. It should not be imagined that the energy demand signal is some DC level. It is rather a dynamic signal that responds nearly instantaneously to inflections of output voltage ripple at VO.

The rising edge of the clock signal sets FF by propagating the logical "1" present its "D" terminal to its output terminal Q. This logical "1" turns ON SWU and turns OFF SWL, applying across L the voltage between terminals VI and VO. The clock signal not only sets flip-flop FF, but also triggers a ramp generator RAMP, which produces an voltage dT that rises linearly in time from an initial voltage at the setting of FF.

The current change in an inductor is proportional to the time for which it is connected to a given voltage. Thus, at the setting of FF, current in L begins to rise, flowing both into C, and through VO to LOAD. Being synchronously started dT is therefore proportional to the change of inductive current since L has begun to be energized.

Inductive energy is proportional to the square of inductive current. Signal dT is applied to both inputs of multiplier TMULT, which produces a voltage dT2 proportional to the square of the elapsed time for which L has been energized since the setting of FF. Thus dT2 approximates the inductive energy in L. Signal Dt2 is applied to the positive input of BAL.

Eventually inductive energy signal dt2 exceeds the energy demand signal KdV, causing BAL to reset FF through AND, thus causing Q to fall, turning OFF switch SWU and turning ON switch SWL. This switching places L in shunt with the voltage between terminals VO and COM. Thus the voltage across L is reversed in polarity and the current therein begins to fall. Current continues to flow into the load, but the inductive energy is decreases until the next setting of FF, at which time dT is re-initialized, and a new time ramp begins along with a new charging of L with inductive energy.

This regulator, therefore, seeks to cause the actual output energy to equal the desired output energy by adjusting inductive energy to annihilate any inequality thereof.

Figure 2:
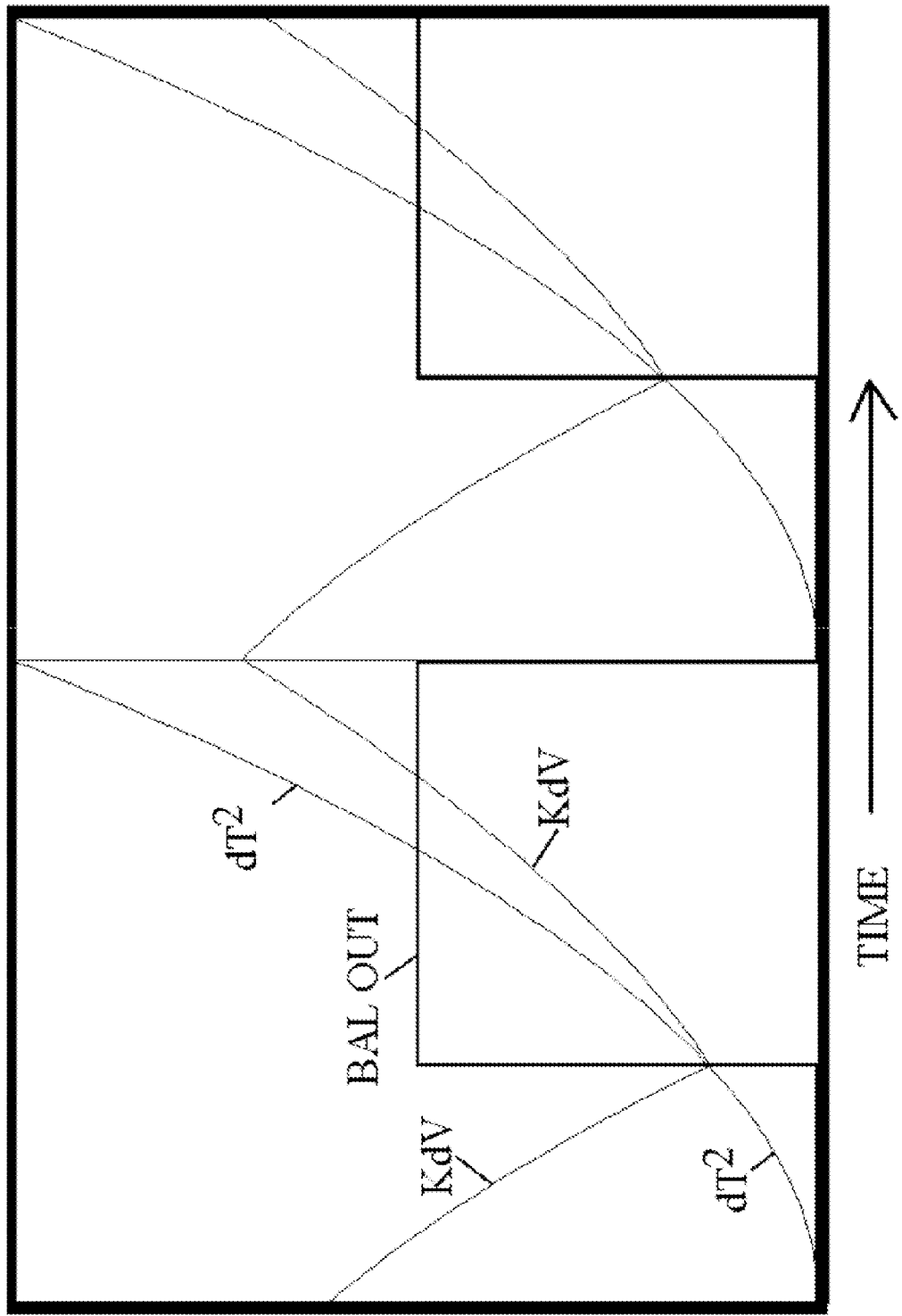
FIG. 2 shows the intersection in time of energy supply and energy supply signals and the attainment of energy balance.

FIG. 2 shows waveforms obtained from a SPICE simulation of the converter of FIG. 1. A dT2 signal may be seen rising from the origin. This signal is not linear inasmuch as it represents the square of elapsed inductive charge time. This signal does approximate inductive energy supply. Descending from the left of the graph is a signal KdV, which looks very much like the ripple at VO. Its descent represents the increasing energy demand at output VO. When KdV intersects dT2, comparator BAL produces the rising edge labeled BAL OUT, which generates the signal that resets the flip-flop FF to end the charging of inductive reactor L. Since energy supply has matched demand, ceasing to charge is the appropriate action. A first cycle ends at the center of the time axis, to be followed by another such cycle.

Figure 3:
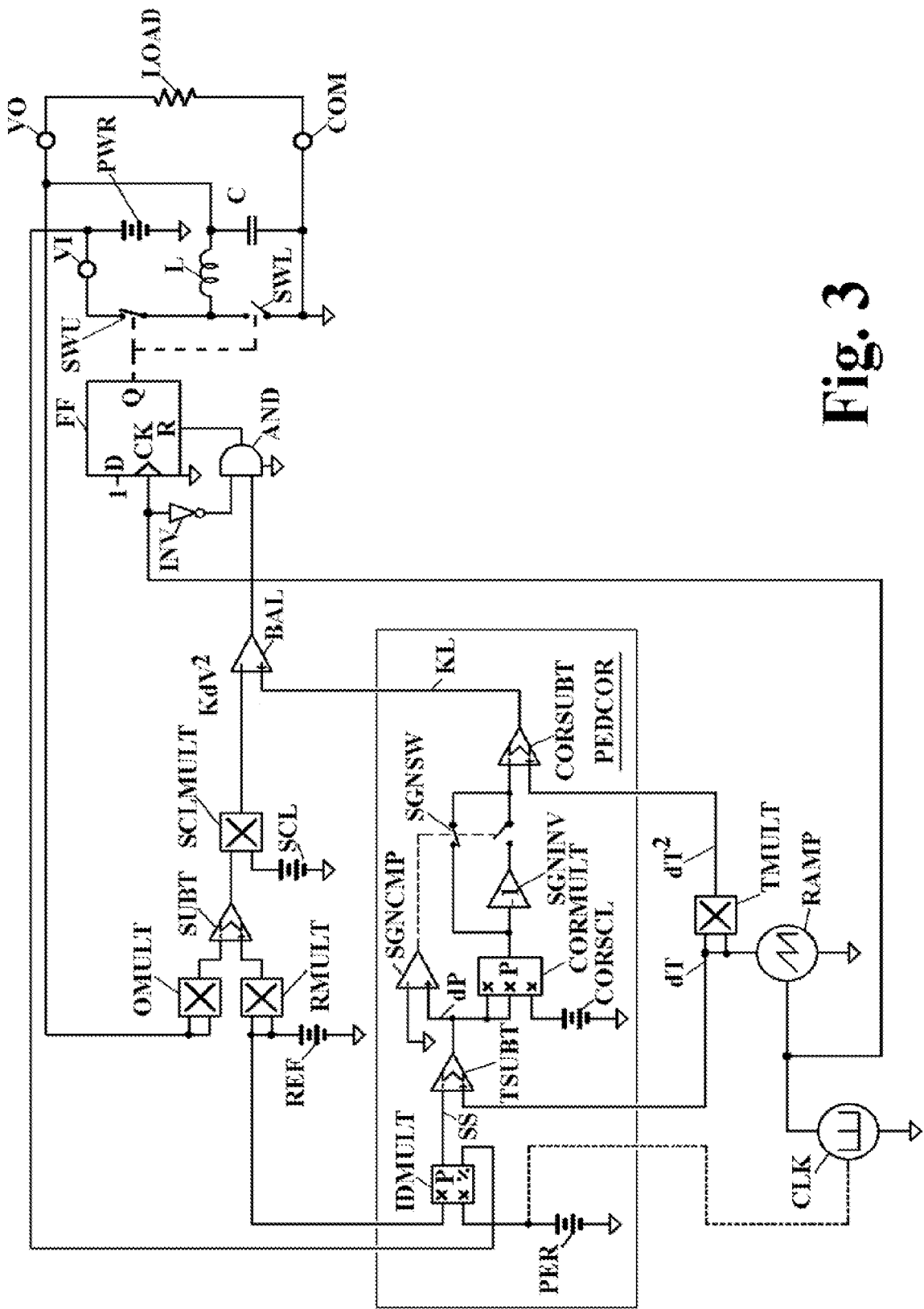
FIG. 3 shows a switched-mode buck power converter also embodying pedestal control according to this invention.

FIG. 3 is identical to FIG. 1, save that a pedestal error correction circuit PEDCOR has been inserted in the path of the dT2 signal on its way to balance comparator BAL, the VI signal and the REF signal have been connected to PEDCOR, a mathematical relationship, indicated by a dashed line, has been established between the CLK signal and PEDCOR.

Pedestal correction functions as follows:

A signal source representing clock period is depicted as voltage source PER which is applied to a multiply input of multiplier-divider IDMULT. To a second multiply input thereof is applied the signal REF, representing the desired output voltage. To a third, divide input of IDMULT is applied the input power source voltage VI. From the product terminal P of IDMULT issues the signal SS, representing the time in the cycle period when an ideal lossless converter would be switched to produce the desired voltage as a steady-state voltage at VO. This ideal voltage is subtracted by subtractor TSUBT from the ramp signal dT to produce a signal dP representing a predicted change of inductor pedestal current. The ramp can be offset in the negative direction to begin below zero volts. This offset predisposes the pedestal correction to overcorrect, eliminating any tendency to alternate cycles. Any overcorrection is removed by the gain of the loop, which can be higher once the tendency to alternate cycles is eliminated.

Signal dP is applied to two multiply inputs of multiplier CORMULT and to a sign comparator SGNCOMP. To a third multiply input of CORMULT is applied a signal from a scaling source CORSCL. From product output P of CORMULT issues a signal representing the scaled square of the difference between dT and SS, which represents an energy correction to be applied to dT2 to adjust the inductive current pedestal to supply the correct predicted inductive energy to meet demand. When the steady state has been attained, and during DCM operation, this term is zero. Since squaring removes needed sign information from the output of TSUBT, an analog inverter SGNINV provides a negative copy of the information at terminal P of CORMULT. Comparator SGNCMP operates switch SGNSW to select the polarity of information matching signal dP. Subtractor CORSUBT subtracts the polarity-selected information from signal dT2 to provide a corrected predicted energy supply signal to comparator BAL. Thus the time of cessation of inductive charging is controlled to provide the predicted energy supply.

Figure 4:
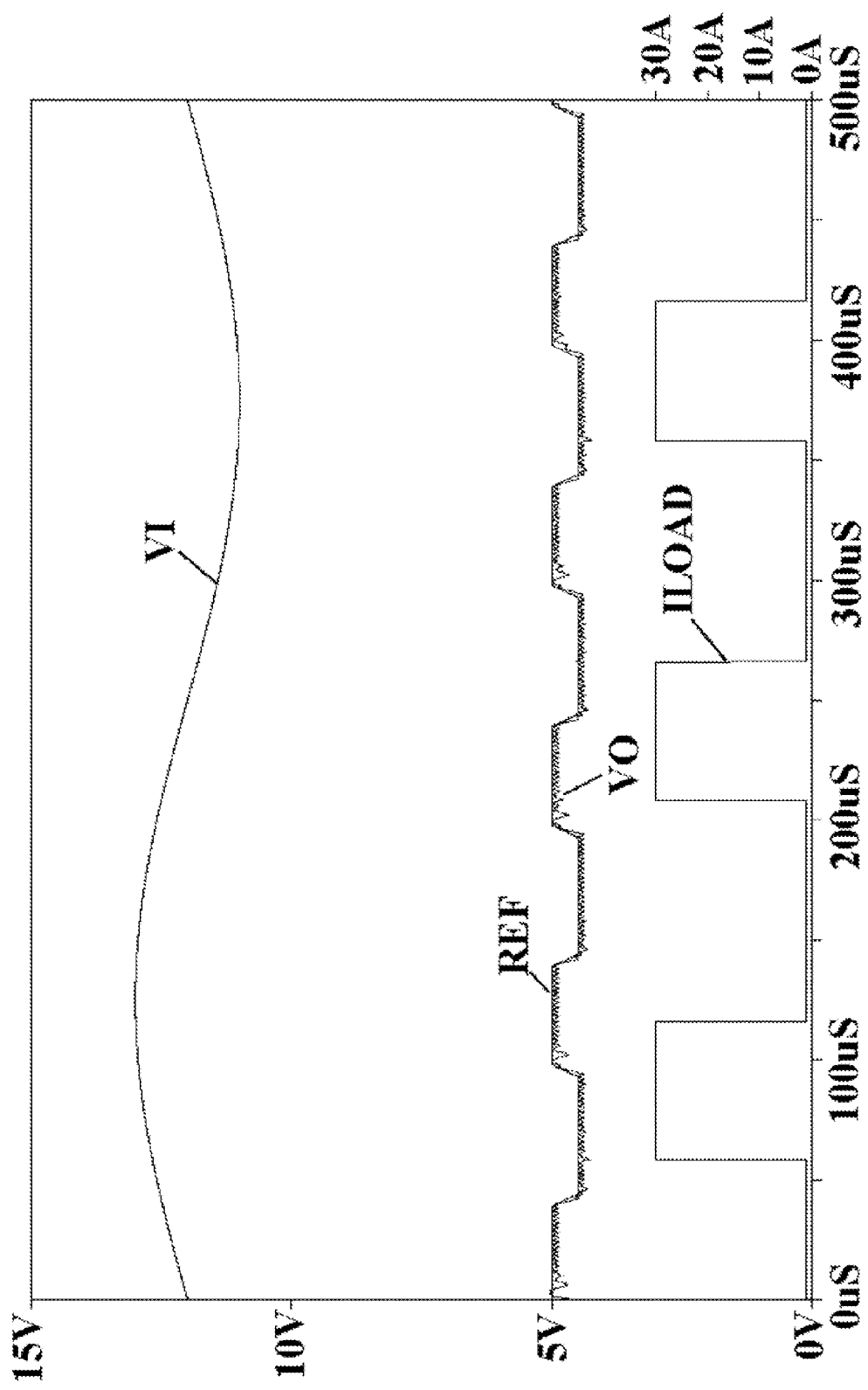
FIG. 4 shows the transient response of a buck converter embodying both regulation and pedestal control according to this invention.

FIG. 4 shows waveforms from a SPICE simulation of the converter with pedestal correction embodied. The output voltage VO can be seen to be closely tracking the desired voltage REF, which is changing between 5 and 4 volts. Despite line variations shown by the VI voltage trace and some large, 30 amps per uS, load transients, the converter responds gracefully and accurately.

Figure 5:
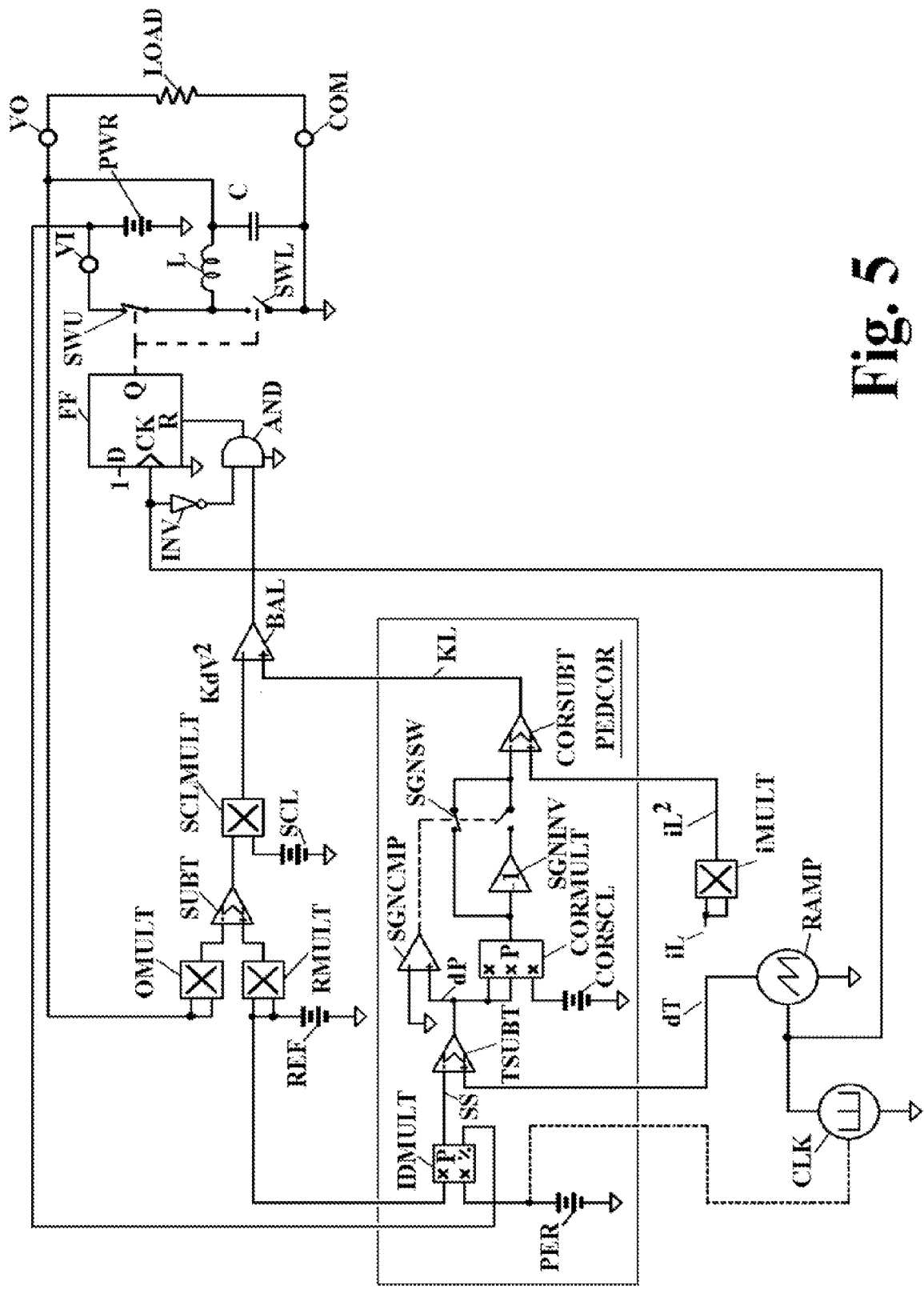
FIG. 5 shows a switched-mode buck power converter that also embodies multi-cycle energy balancing according to this invention.

FIG. 5 is identical to FIG. 3, save that a signal representing iL has been substituted for dT, and iMULT replaces TMULT. iL can be a measured current, a volt-time product, or estimation based on time alone. iL is squared by iMULT to produce iL2. iL2 includes energy information from the previous cycle or cycles. The incorporation of a representation of the recent inductive energy history allows the energy balance to straddle chopping cycles. Note that if the inductive energy can reverse sign, sign restoration, like that for DP, would be needed for the iL2 term.

Figure 6:
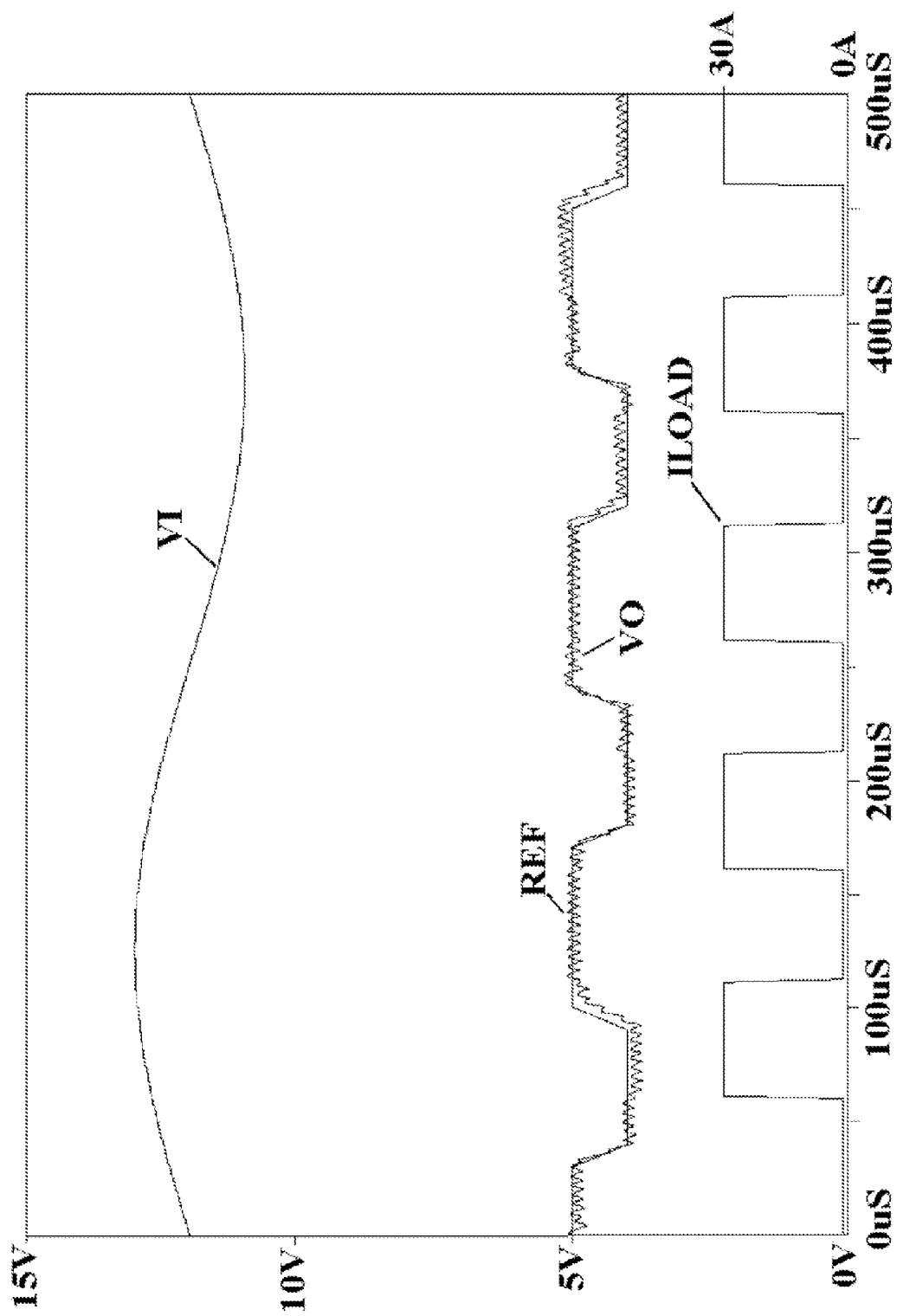
FIG. 6 shows the transient response of a buck converter embodying regulation, and pedestal control, and multi-cycle energy balancing according to this invention.

FIG. 6 shows waveforms from a SPICE simulation of the converter with multi-cycle inductive energy balance embodied. The output voltage VO can be seen to more closely track the desired voltage, REF.

To practice this invention, the reference may be represented by a digital quantity and all the processes described above may be embodied in a well-known micro-controller or digital signal processor. In the simplest form of FIG. 1, the actual output voltage is the only analog quantity that needs to be processed, probably by a well-known analog-to-digital converter (ADC). Time can be easily tracked using the microcontroller's clock. The input to the totem-pole switch acts as a single bit digital-to-analog converter (DAC), through which the feedback loop through the power circuitry to the converter actual output voltage measurement is closed. When pedestal control is to be practiced, a second A/D channel is required. If a voltage proportional to VI is used as the A/D reference, the conversion result for voltage REF will be the ratio of REF to VI, the desired quantity.

For multi-cycle energy balance to be most useful without measuring the DC component of the inductive current, the inductor size, chopping period, and voltages ratios should be chosen such that the inductor can charge or discharge at least 5% of its maximum current in a single cycle.

The low-side switch in the buck converter totem pole can be replaced by a diode, as is common in the art. That substitution may require minor adjustments in the scaling and gain factors for optimization, but will not materially effect the controls described. Some loss of efficiency is expected with the diode substitution.

What is claimed:

1. A switched-mode buck power converter comprising:
   a power source;
   a first switch;
   an inductor for storing energy having a first end connected to an output node of the power converter, wherein the first switch is connected between the power source and a second end of the inductor;
   a diode or a second switch connected, at the second end of the inductor, between the first switch and a common node of the power converter; and
   control circuitry configured to:
   (i) characterize per cycle energy demand of the power converter;
   (ii) characterize per cycle inductive energy of the power converter; and
   (iii) compare the characterized energy demand to the characterized inductive energy to control the first switch.

2. The power converter of claim 1 wherein the control circuitry uses a feedback signal that explicitly incorporates the energy in the inductor from previous cycles.

3. The power converter of claim 2 wherein the feedback signal incorporates a prediction of the energy which will remain in the switched inductor at the end of the present chopping cycle.

4. The power converter of claim 2 wherein the feedback signal incorporates a measured current, a volttime product or estimation based on time alone.

5. The power converter of claim 1 wherein, when the first switch is closed, the control circuitry is configured to open the first switch when the control circuitry determines that the characterized inductive energy reaches the characterized energy demand.

6. The power converter of claim 1 wherein the control circuitry is configured to characterize the energy demand of the power converter based on a determined difference between (i) a square of measured output voltage of the power converter and (ii) a square of a desired output voltage of the power converter.

7. The power converter of claim 1 wherein the control circuitry is configured to characterize the inductive energy of the power converter based on the square of a volttime product.

8. The power converter of claim 1 wherein the control circuitry is configured to characterize the inductive energy of the power converter based on an elapsed charging time.

9. The power converter of claim 8 wherein the control circuitry is configured to characterize the inductive energy of the power converter as a square of the elapsed charging time.

10. The power converter of claim 8 wherein the elapsed charging time is measured from the beginning of a current chopping cycle for the power converter.

11. The power converter of claim 1 wherein the control circuitry is configured to characterize the inductive energy of the power converter based on a ramp signal.

12. The power converter of claim 11 wherein the control circuitry is configured to characterize the inductive energy of the power converter as a square of the ramp signal.

13. The power converter of claim 11 wherein the ramp signal is reset at the beginning of a current chopping cycle for the power converter.

14. The power converter of claim 1 wherein the control circuitry is configured to characterize the inductive energy of the power converter based on a current measurement by a current sensor electrically coupled to the inductor.

15. The power converter of claim 14 wherein the control circuitry is configured to characterize the inductive energy of the power converter as a square of the current measurement.

16. The power converter of claim 1 wherein the control circuitry is configured to characterize the inductive energy of the power converter based on a product of (i) a voltage measurement of voltage across the inductor and (ii) a time measurement of time said voltage was applied.

17. The power converter of claim 1 wherein the characterized energy demand incorporates a square of a desired output voltage less a square of an actual output voltage.

18. The power converter of claim 1 wherein the control circuitry operates the first switch so that, during each chopping cycle of the power converter, the inductor is charged until the characterized inductive energy is greater than the characterized energy demand.

19. The power converter of claim 1 wherein the feedback term is based upon a calculation of a quantity proportional to the square of the ideal inductive charging time less a quantity proportional to the elapsed charging time.

20. The power converter of claim 1 wherein the inductor current at the beginning of a next chopping cycle is predicted and used to adjust energy supply in the power converter.

* * * * *